US012518941B1

(12) United States Patent
Rauckman et al.

(10) Patent No.: US 12,518,941 B1
(45) Date of Patent: Jan. 6, 2026

(54) CUTOUT COVER

(71) Applicant: Gato Assets, LLC, Belleville, IL (US)

(72) Inventors: James B Rauckman, Swansea, IL (US); David W McGuire, Jerseyville, IL (US)

(73) Assignee: NSA RUP, LLC, Cleveland, OH (US)

(*) Notice: Subject to any disclaimer, the term of this patent is extended or adjusted under 35 U.S.C. 154(b) by 259 days.

(21) Appl. No.: 18/316,078

(22) Filed: May 11, 2023

(51) Int. Cl.
*H01H 31/12* (2006.01)
*H01H 85/165* (2006.01)
*H01H 85/20* (2006.01)

(52) U.S. Cl.
CPC ........ *H01H 85/165* (2013.01); *H01H 31/127* (2013.01); *H01H 85/2045* (2013.01)

(58) Field of Classification Search
CPC ....... H01H 31/125–127; H01H 85/165; H01H 85/2045
See application file for complete search history.

(56) References Cited

U.S. PATENT DOCUMENTS

| | | | | |
|---|---|---|---|---|
| 2,263,319 A | | 11/1941 | Treanor | |
| 3,692,927 A | | 9/1972 | Ellaschuk | |
| 3,825,871 A | * | 7/1974 | Blewitt | H01H 31/127 337/171 |
| 4,845,307 A | | 7/1989 | Cumming et al. | |
| 5,300,912 A | * | 4/1994 | Tillery | H01H 31/127 174/209 |
| 6,255,597 B1 | | 7/2001 | Bowling et al. | |
| 6,291,774 B1 | | 9/2001 | Williams | |
| 6,963,025 B1 | | 11/2005 | Kysely | |
| 6,995,313 B1 | | 2/2006 | Barnett et al. | |
| 7,276,665 B1 | | 10/2007 | Rauckman | |
| 7,297,869 B2 | | 11/2007 | Hiller et al. | |
| 7,786,841 B2 | | 8/2010 | Kesting | |
| 8,723,056 B2 | | 5/2014 | Kaddas et al. | |
| 9,787,071 B1 | * | 10/2017 | Rauckman | H02G 3/0418 |
| 9,916,956 B1 | * | 3/2018 | Rauckman | H01H 69/02 |
| 2004/0184210 A1 | | 9/2004 | Lynch | |
| 2008/0128163 A1 | * | 6/2008 | Bradford | H01H 85/25 174/5 R |
| 2020/0245610 A1 | * | 8/2020 | Lynch | A01M 29/32 |

OTHER PUBLICATIONS

Photographs of Cutout Cover, 1 page, at least as early as May 10, 2022.
Kaddas Catalog, Wildlife Power Outage Protection Products BirdguarD Line, www.kaddas.com, 24 pages, 2016.

* cited by examiner

*Primary Examiner* — Jacob R Crum
(74) *Attorney, Agent, or Firm* — Stinson LLP

(57) ABSTRACT

A fuse cutout assembly cover including an insulator cover end for positioning over a cutout assembly insulator and including a shield end for shielding a cutout upper contact assembly. The insulator cover is constructed to receive a variety of insulator and cutout assembly configurations.

20 Claims, 17 Drawing Sheets

CUTOUT COVER

FIELD

This disclosure relates generally to covers for fuse cutout assemblies employed in electric energy distribution systems and more particularly to a cover for protecting the cutout from invasion by wildlife, such as birds or squirrels which can result in death of the animal and/or interruption of electrical service.

BACKGROUND

Utility companies, particularly electric companies, employ cutout assemblies which include removable fuse tubes or fuse holders in electric energy distribution systems. The devices, usually energized to 7200 volts, generally include an insulator mounted on a bracket having spaced contact assemblies. A lower contact assembly has mount structures, and an upper contact assembly includes an integral latching member, usually spring loaded. A fuse holder with an internal fuse link includes a lower end with opposing contacts adapted to attach to the mounts. The upper end of the fuse tube has a latching contact end shaped for engagement with the upper contact assembly of the bracket. The fuse holder is removably positioned both physically and electrically in parallel with the insulator.

In an overcurrent situation, the fuse link melts, causing the fuse holder to drop and pivot downward. In order to replace the fuse link, the fuse holder has to be removed from the cutout body. Removal of the fuse holder is generally accomplished by engaging the operating end of an extended hot stick with the fuse holder near the bottom. The fuse holder is lifted out of the cutout assembly and the fuse link replaced. In other instances, it may be necessary to open the circuit at the cutout assembly even while current is flowing through the fuse link in the fuse holder, by pulling the fuse holder to open the circuit. Anytime there is voltage present a load break tool is used to pull the fuse holder open while inhibiting arcing. The fuse holder is pulled away from the upper contact cutting off electricity at the location of the cutout assembly.

Wildlife, such as birds or squirrels can access the fuse cutout assembly and build nests, which may catch fire, particularly if a fuse link blows, or be electrocuted by touching an energized area of the fuse cutout assembly and ground. The electrocution of the wildlife may cause the fuse link to blow, resulting in a power outage. If the wildlife is a protected species such as a red-tailed hawk the utility company may be required to report the bird's death and be required to take measures to prevent further incidents.

Various cutout covers have been employed to cover the fuse cutout assembly to prevent access by wildlife, all with mixed results. In general, a shotgun stick (or other type of hot stick) is used to install the conventional cutout covers over the fuse cutout assembly. In other cases, insulating rubber gloves are used to install the prior art cutout covers. Known cutout covers generally have limited applicability. In other words, they are generally designed to fit over only one size or configuration of a fuse cutout assembly. Often these cutout covers leave substantial room or gaps between the cover and the cutout, allowing wildlife access. Moreover, they include only one or a limited number of hot stick access points, limiting the lineman's ability to grasp and install the cover at various angles. Also, they require the use of separate securing structure, such as fasteners, pins or buttons to hold the cover in place and prevent dislodgment by wind.

Our prior, co-assigned U.S. Pat. No. 9,916,956 (the disclosure of which is incorporated herein by reference) discloses a cutout cover that addresses many of the aforementioned issues. However, more recently there has arisen a need to provide an even more adaptable cutout cover to work with cutout assemblies having a wider array of configurations.

SUMMARY

In one aspect, a fuse cutout cover is used with fuse cutout assemblies having insulators of different sizes and configurations. The fuse cutout assemblies each further include a fuse and an upper contact assembly for engaging an upper end of the fuse. A cover constructed according to the principles of the present invention generally comprises a contact assembly shield configured for shielding the upper contact assembly. An insulator cover configured for covering at least an upper end of the insulator comprises a hollow body having a central longitudinal axis. The hollow body includes a first side wall having a first height, and a second side wall disposed above the first side wall. The second wall has a second height and at least a portion of the second wall is located inwardly of the first wall toward the longitudinal axis of the hollow body. The second height of the second wall is greater than or equal to one half of the first height of the first wall. A third side wall disposed above the second side wall has a third height and at least a portion of the third wall is located inwardly of the second wall toward the longitudinal axis of the hollow body.

In another aspect, a fuse cutout cover is used with fuse cutout assemblies having insulators of different sizes and configurations. The fuse cutout assemblies each further include a fuse and an upper contact assembly for engaging an upper end of the fuse. A cover constructed according to the principles of the present invention generally comprises a contact assembly shield configured for shielding the upper contact assembly. An insulator cover configured for covering at least an upper end of the insulator comprises a hollow body including a first side wall, and a second side wall disposed above the first side wall. A third side wall is disposed above the second side wall. The second side wall is shaped to form a first space having a first cross sectional area, and a second space having a second cross sectional area smaller than the first cross sectional area.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
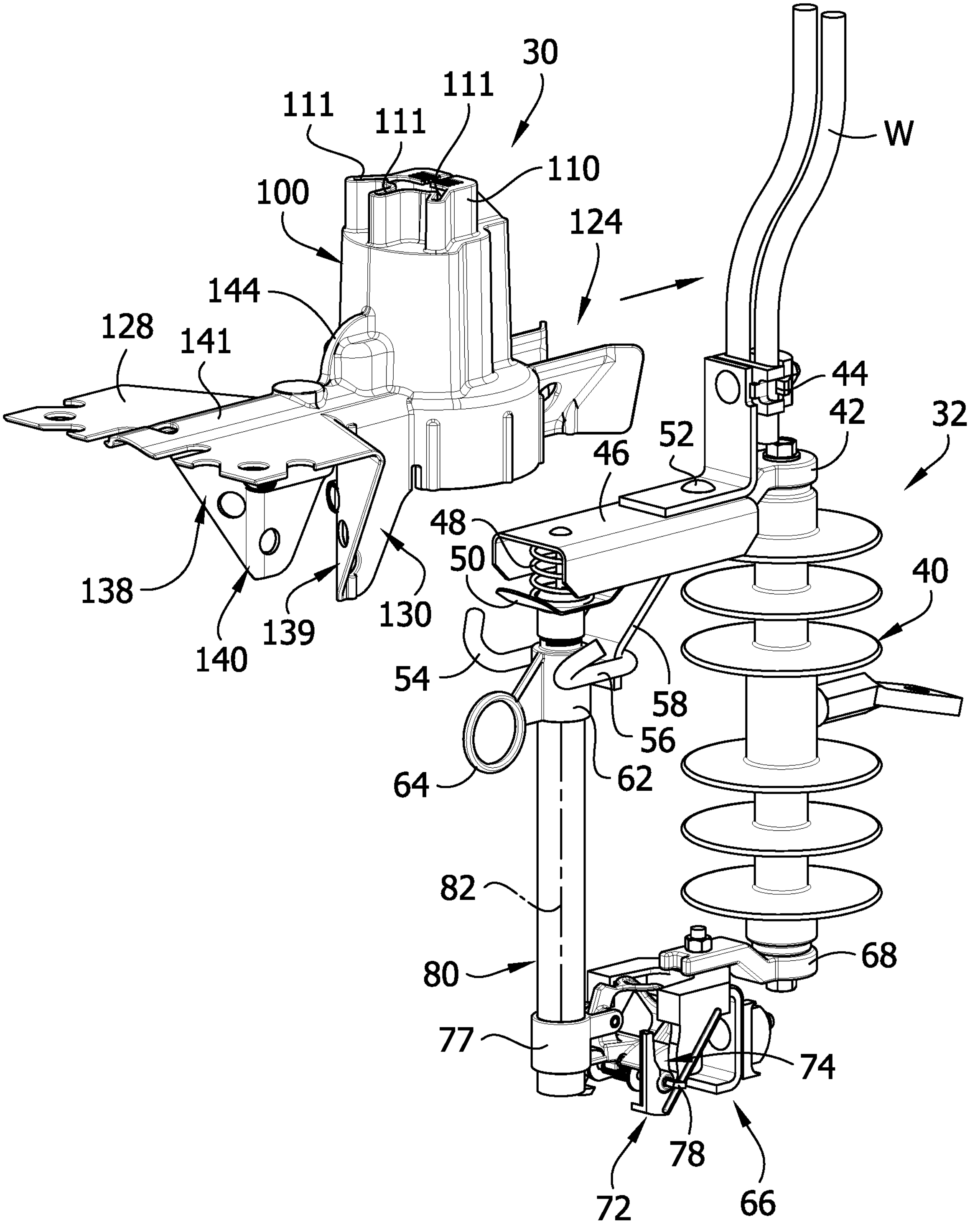
FIG. 1 is a perspective of an aspect of a cutout cover adjacent a fuse cutout assembly.

A cutout cover of the present disclosure is indicated generally by reference number 30 in the various drawings. The cutout cover 30 is intended to be mounted or installed on a fuse cutout assembly, indicated generally by reference number 32. The conductive elements of a fuse cutout are usually energized at 7200 volts and could be energized up to 20,000 volts with respect to ground. In most instances, the cover 30 is installed with a shotgun stick (a type of hot stick), represented generally by number 34 in FIG. 2. In this embodiment, shotgun stick 34 includes a retractable spike and a hook arrangement 36 and is used in a manner as will be described in relation to the cover 30 hereinafter. The construction and operation of the shotgun stick 34 are well known to those of ordinary skill in the art.

Figure 2:
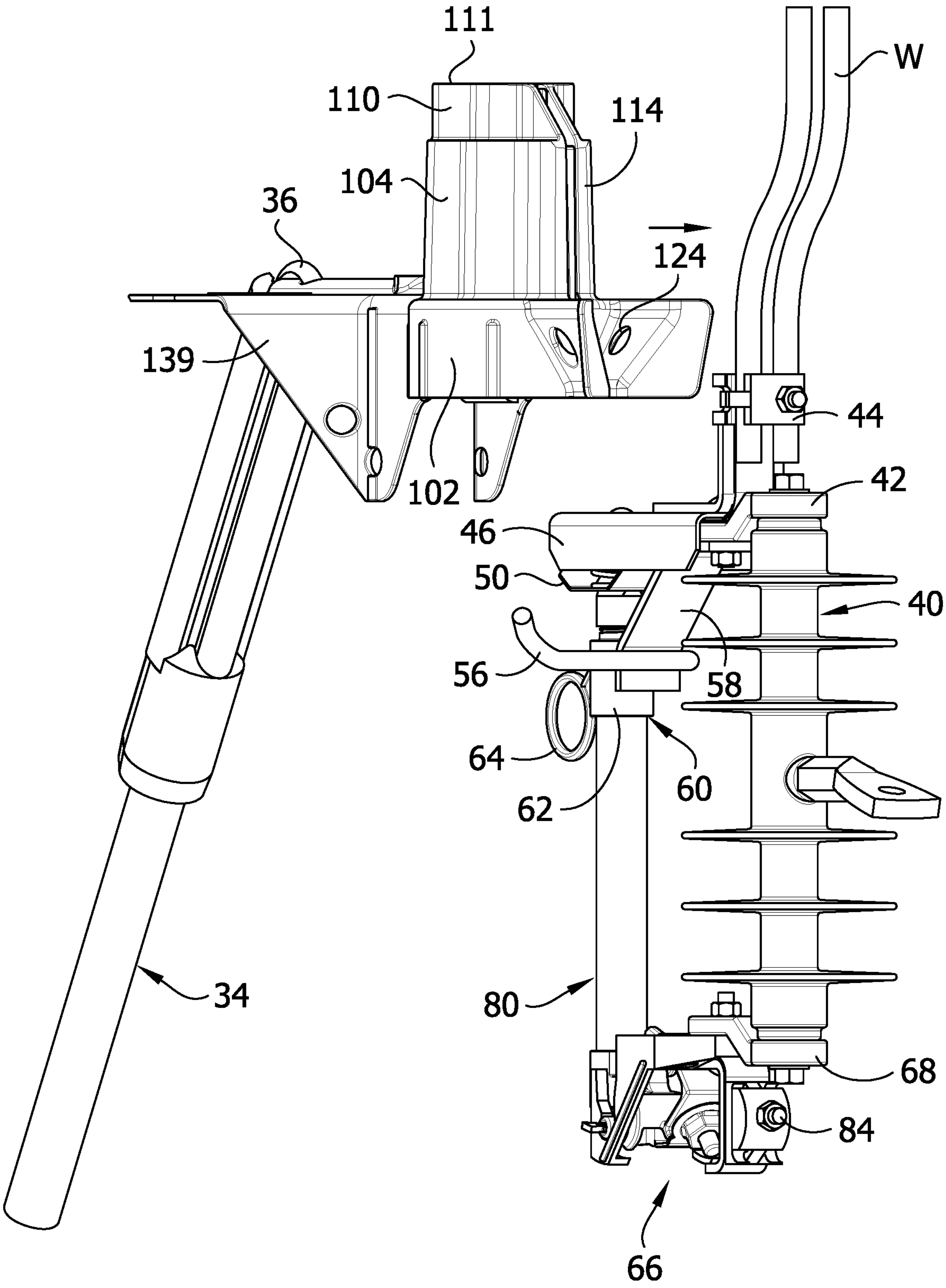
FIG. 2 is a perspective from a different vantage showing the cutout cover carried by a shotgun stick adjacent to the fuse cutout assembly.
Figure 3:
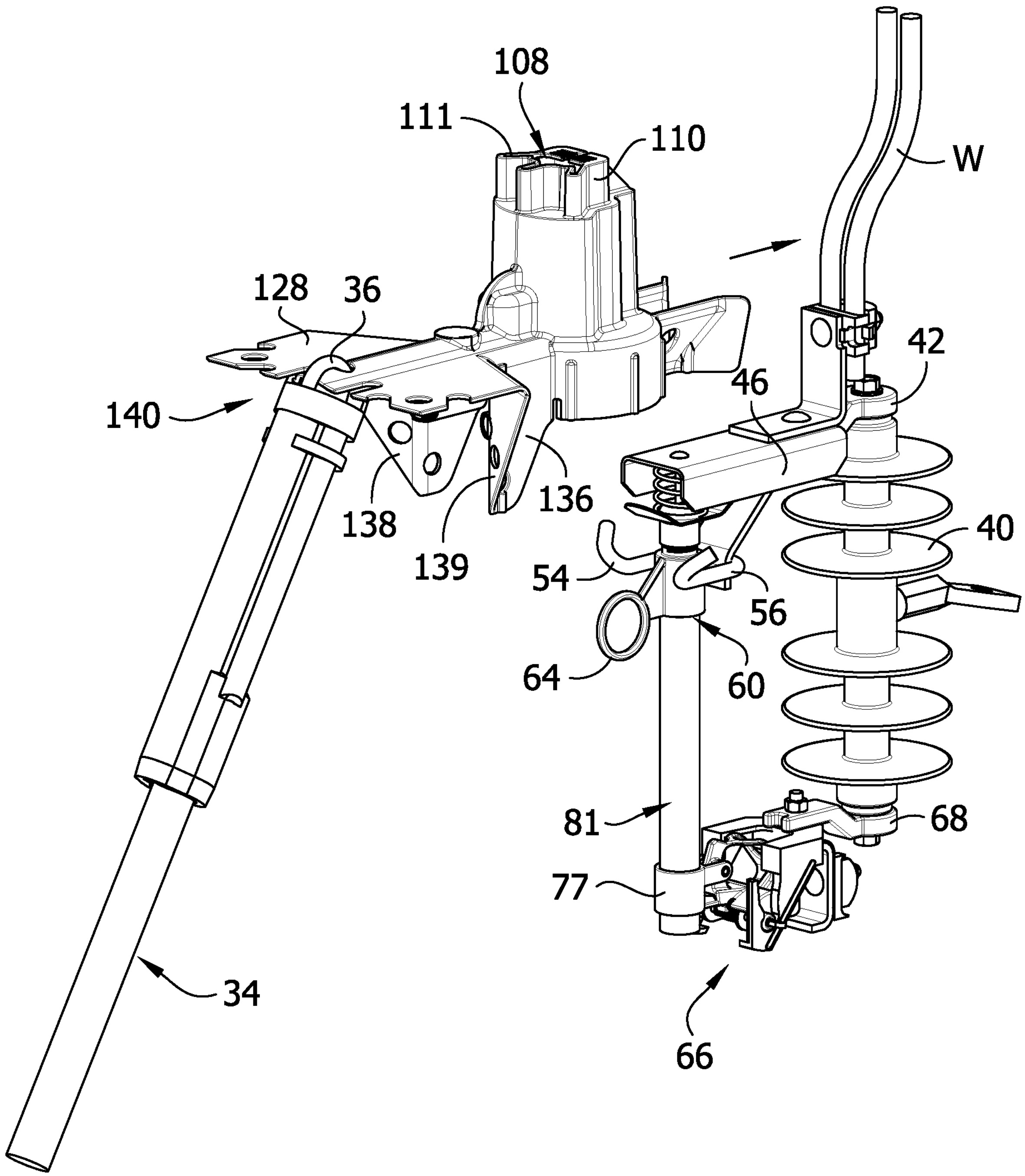
FIG. 3 is the perspective of FIG. 2 from a vantage behind the cutout assembly.

As shown in FIGS. 1 and 2, the cutout assembly 32 generally includes an insulator 40 desirably constructed from a dielectric material such as polymer or ceramic. A frame member 42 at the upper end of the insulator is connected to an upper contact assembly comprising an upper conductive terminal 44 energized by wires W. The frame member 42 further includes a metal channel commonly referred to as a sleet hood 46, an ejector spring 48, and a spring biased contact 50. The contact is operatively connected to a rivet 52. A pair of opposed hooks 54, 56 provide for the removable attachment of a load break tool or other tools, as is known in the art and as will be further explained below. The hooks 54 and 56 are electrically connected to the conductive terminals by a connector bridge 58 attached to the frame member 42. A top fuse tube casting 60, generally cast from bronze, includes a fuse ferrule 62 and a pull ring 64.

Figure 8:
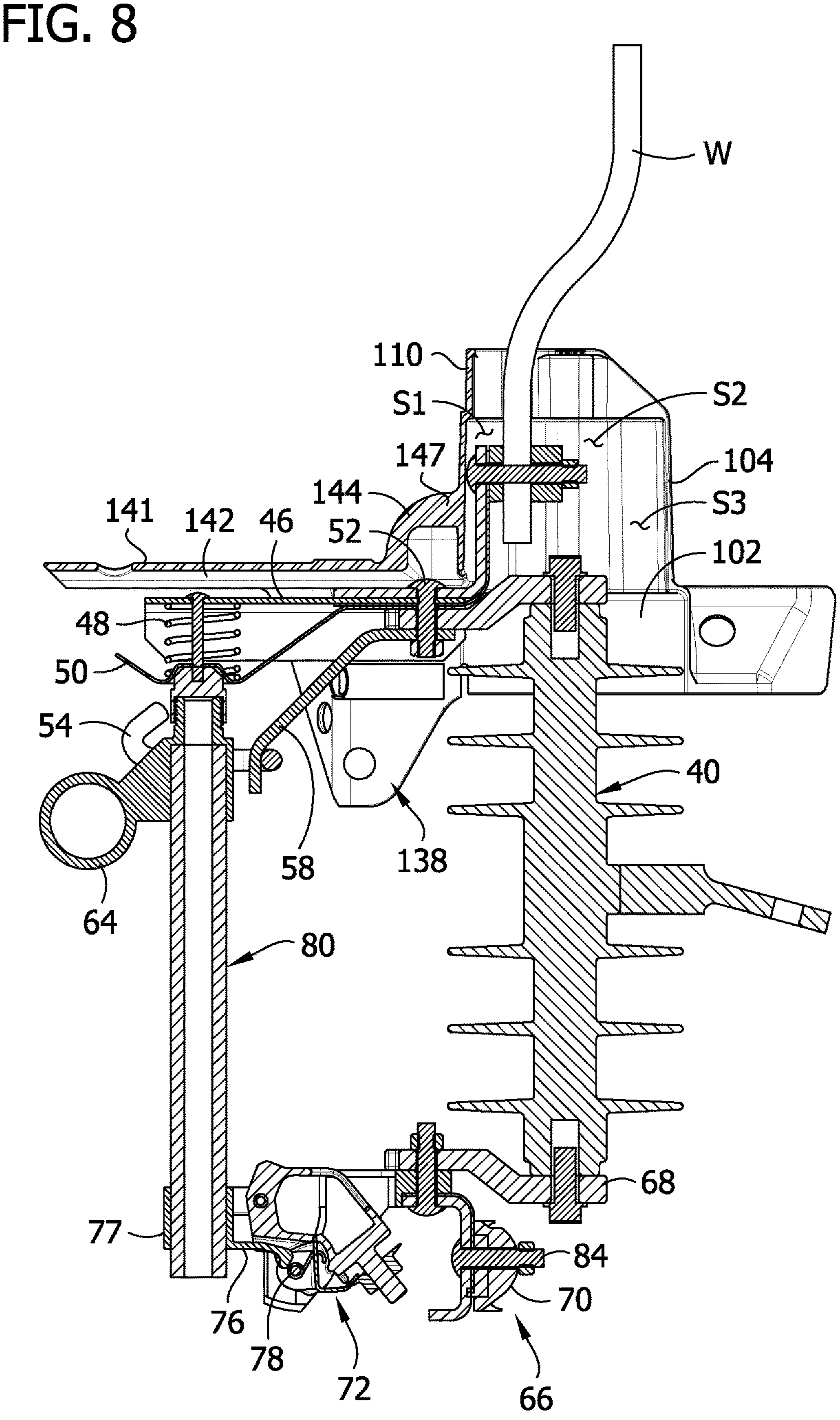
FIG. 8 is a section taken in the plane including line 8-8 of FIG. 7.
Figure 9:
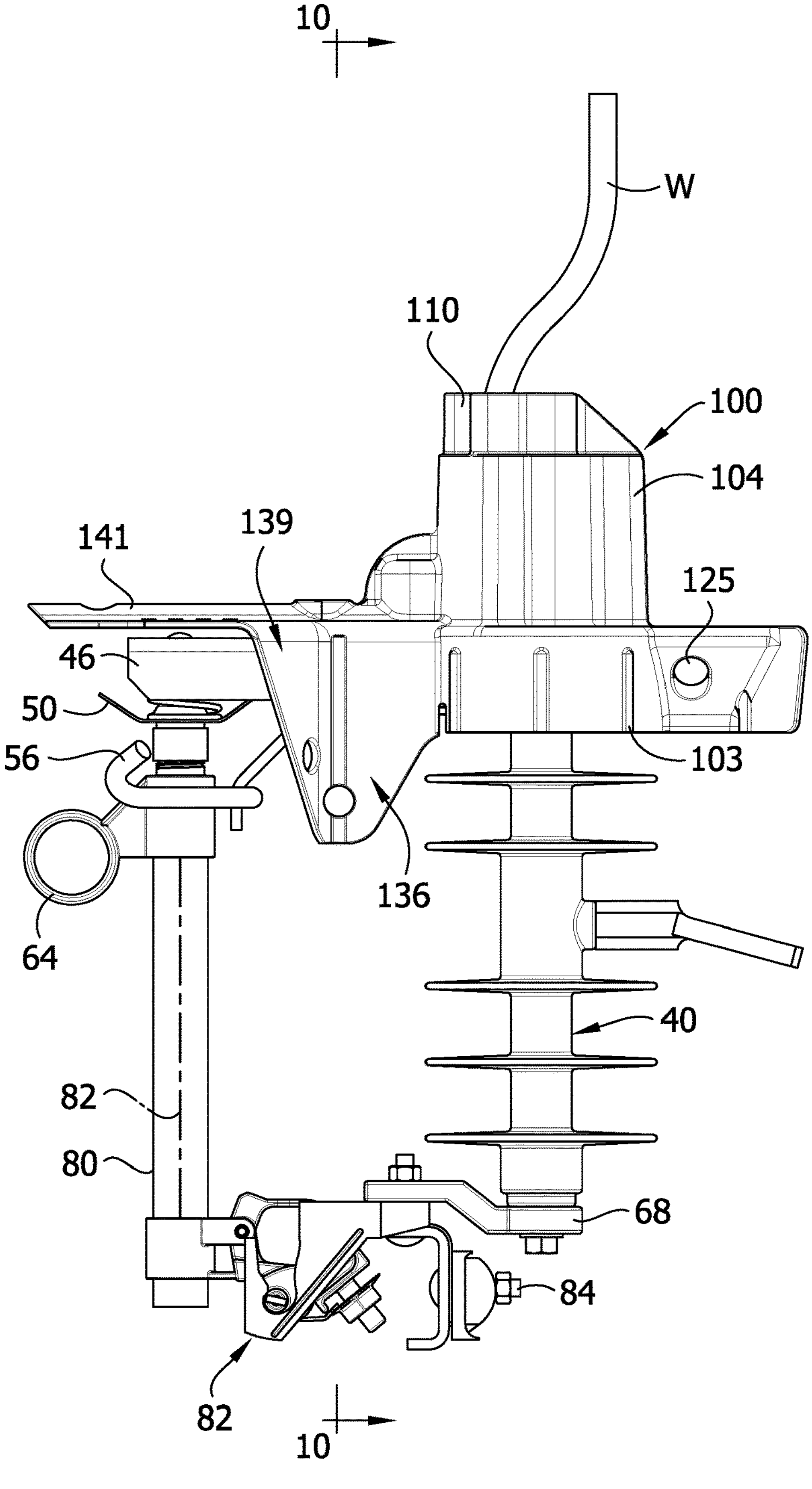
FIG. 9 is a side elevation of the cutout cover mounted on the fuse cutout assembly.

A lower contact assembly 66 is connected to the insulator by frame member 68. The lower contact assembly 66 comprises a trunnion 72, generally cast from bronze, having a trunnion pocket and a lower fuse tube casting 76 including a ferrule 77 (see, e.g., FIG. 8). In general, the lower fuse tube casting 76 includes a hinge 78 that rotatingly seats in the pocket of the trunnion 72.

A conventional fuse tube 80 is mounted in ferrules 62 and 77 and extends between the upper and lower contact assemblies. The fuse tube 80 is of conventional design comprising a high strength fiberglass tube housing a fuse link 82 as known in the art and which functions in a manner known in the art. The trunnion 72 includes a fuse link connection nut 84 (FIG. 8) for attachment of the bottom end of fuse link 82 which is in electrical connection with a lower terminal 70. The fuse link 82 extends around the trunnion to create tension on the fuse link when fuse tube is installed. The fuse link 82 provides electrical contact with the lower contact assembly 66.

When installed, the fuse link 82 is electrically connected between the upper contact and the lower contact. It will be appreciated that, when the contained fuse link operates ("blows"), there can be an electrical arc within the fuse tube that heats condensate and produces a buildup of steam or inert gasses. When the fuse link blows, tension is released and the fuse tube drops down and pivots around the hinge 78 and hangs from the hinge providing visible indication that the fuse link has operated and assurance that the circuit is open. Cutouts are typically mounted about 20 degrees off vertical so that the center of gravity of the fuse holder is displaced and the fuse holder will rotate and fall open under its own weight when the fuse blows.

Cutout fuses may be opened manually to interrupt service. In such a situation, a tool, such as a hot stick, can be used to grasp the pull ring 64 and disconnect the top end of the fuse tube 80 to interrupt service. Those skilled in the art will recognize that disconnecting the fuse tube when the fuse is energized creates a high risk of arcing between the top terminal and the upper fuse tube casting or other conductive elements. To eliminate this risk, the technician employs a load break tool, such as a Loadbuster® tool (available from S & C Electric Company, 6601 North Ridge Boulevard, Chicago, Illinois 60626).

It will be understood that the construction of the cutout assembly may vary depending upon the manufacturer and intended function. The foregoing description of the cutout assembly 32 is intended to be a general disclosure of a typical cutout assembly with which the disclosed cutout cover may be employed. One representative embodiment of a fuse cutout assembly and related art are described in U.S. Pat. No. 7,786,841, the disclosure of which is incorporated herein by reference.

The cutout cover 30, shown in greater detail in FIGS. 12-17, is preferably a unitary piece. While the drawings appear to show separate sections, it will be noted such dividing lines or transition points result from changes in angles or shapes of the cover and are not intended to indicate separate sections. Hence, it should be understood, the cover 30 is considered a unitary piece molded as one piece. However, the cover can be non-unitary. Also, reference will be made to front and rear and top and bottom aspects of the cover for ease of description; these are relative terms.

The cover 30 includes a first portion 100, which can be broadly referred to as an insulator cover, comprising a hollow body having a longitudinal axis L (e.g., a central longitudinal axis). The insulator cover 100 is configured to cover at least an upper end of the insulator 40 (see, FIG. 8), and is defined in part by a first circumferential wall 102 (broadly, a first side wall). In the illustrated embodiment, the first circumferential wall 102 comprises a vertically extending wall having a generally cylindrical configuration. The first circumferential wall 102 has a first height and defines an internal (circular) cross sectional area enclosed by the first circumferential wall. The first circumferential wall 102 may also have external ribs 103 for added strength. The hollow body of the insulator cover 100 may be further defined by a second circumferential wall 104 (broadly, a second side wall) disposed above the first circumferential wall 102. The second circumferential all 104 comprises a vertically extending wall, at least a portion of which is located inward of the first circumferential wall 102 toward the longitudinal axis L. In the illustrated embodiment, the second circumferential wall 104 is everywhere spaced inward from the first circumferential wall in a direction toward the longitudinal axis L. In other embodiments (not shown), at least a portion or at least a majority of the second circumferential wall is spaced inward from the first circumferential wall toward the longitudinal axis L. The second circumferential wall 104 has a second height and encloses a cross sectional area that is smaller than the cross sectional area enclosed by the first circumferential wall 102. The second height of the second circumferential wall 104 is preferably greater than or equal to one half the first height of the first circumferential wall 102. As shown, the second height of the second circumferential wall is greater than the first height of the first circumferential wall 102.

In the illustrated embodiment, the second circumferential wall 104 has a non-circular cross-sectional shape such that the wall is non-cylindrical. For example, the second circumferential wall 104 may include a first wall section 113A and a second wall section 113B on the opposite side of the longitudinal axis L from the first wall section. The second circumferential wall 104 further includes and arcuate third wall section 115 extending between and connecting (rearward) ends of the first and second wall sections 113A, 113B at front end of the second circumferential wall. Fourth and fifth wall sections 117A, 117B of the second circumferential wall 104 are generally located at (forward) ends of the first and second wall sections 113A, 113B (respectively) that are opposite the ends of the first and second wall sections joined by the third wall section 115. The fourth and fifth wall sections 117A, 117B are located at and define a rear end of the second circumferential wall 104. The fourth and fifth wall sections 117A, 117B oppose each other and are substantially mirror images of each other in shape. Each of the fourth and fifth wall sections 117A, 117B have a generally L-shape. The first and second wall sections 113A, 113B are also substantially mirror images of each other, each having a generally serpentine shape. Each of the first and second wall sections 113A, 113B extends from a respective end of the arcuate wall section 115 to a corresponding one of the fourth and fifth wall sections 117A, 117B. It will be understood that the wall sections 113A-117B may have other shapes within the scope of the present invention. Moreover, the wall sections 113A, 113B and 117A, 117B do not need to be mirror images of each other.

Figure 15:
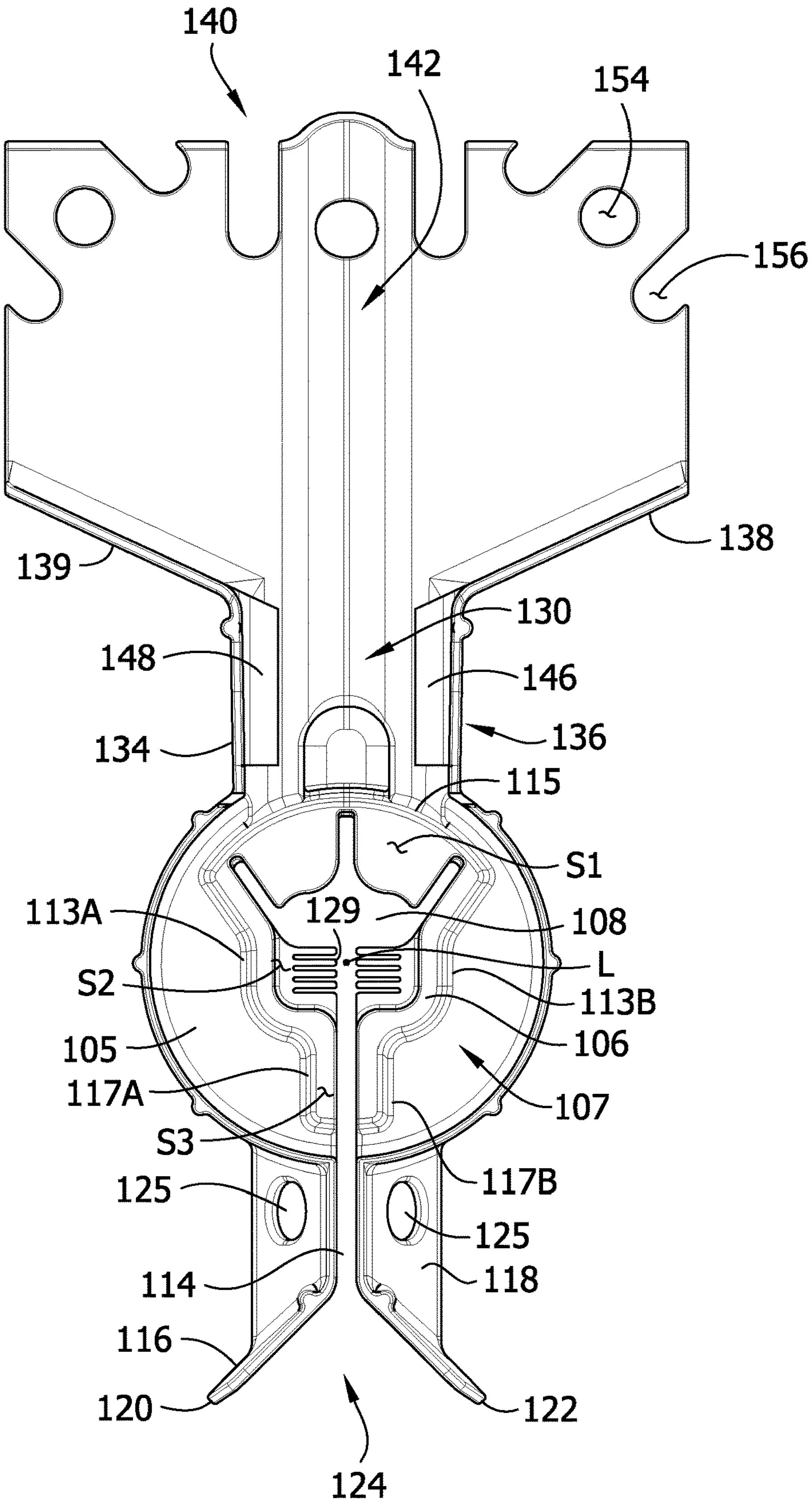
FIG. 15 is a bottom view thereof.
Figure 16:
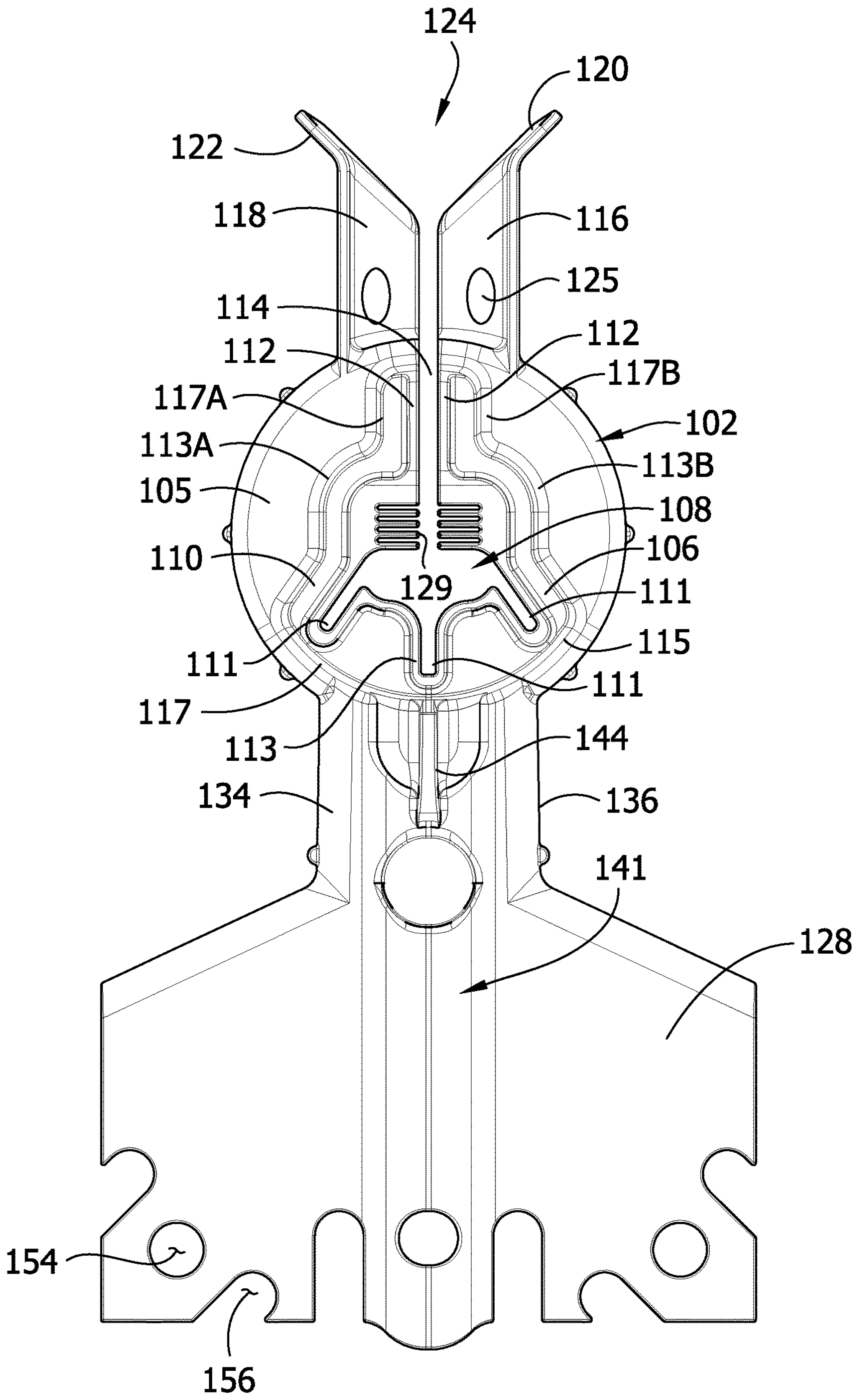
FIG. 16 is top view thereof.
Figure 17:
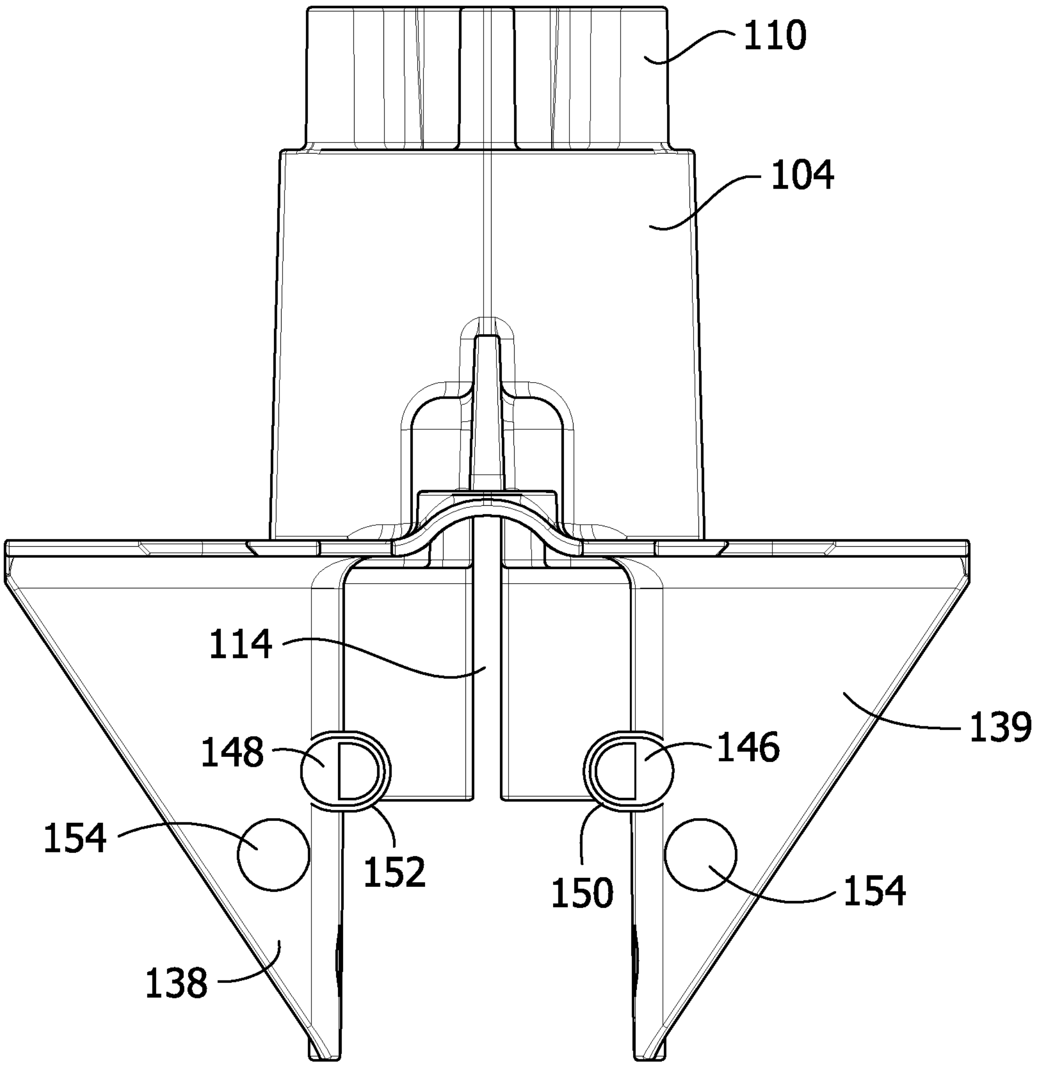
FIG. 17 is a front elevation thereof.

Referring now to the bottom view of FIG. 15, the second circumferential wall 104 is shaped to form a first space S1 having a first cross sectional area and a first volume. The first space S1 is defined angled portions of the first and second wall sections 113A, 113B and the arcuate third wall section 115. The second circumferential wall 104 further defines a second space S2 having a second cross sectional area and a second volume. The second cross sectional area of the second space S2 is smaller than the first cross sectional area of the first space S1. As shown, the second volume of the second space S2 is also smaller than the first volume of the first space S1. The second space S2 is defined by the curved, rearward portions of the first and second wall sections 113A, 113B. A third space S3 defined by the fourth and fifth wall sections 117A, 117B has a third cross sectional area and third volume. The third cross sectional area of the third space S3 is less than the cross sectional area of the second space S2. The third volume of the third space S3 is also less than the second volume of the second space S2. The first, second and third spaced S1, S2, S3 open into each other to define a contiguous open volume inside the second circumferential wall 104. The configuration of the second circumferential wall 104 and the first, second and third spaces S1, S2, S3 allows the first portion 100 of the cover 30 to fit securely onto insulator upper ends having different configurations. Therefore, the cover 30 of the present invention is usable with a large number of different insulator configurations currently used in the marketplace.

A generally horizontal first top wall 105 (broadly, a transverse wall) extends between a top of the first circumferential wall 102 and a bottom of the second circumferential wall 104 forming a shoulder on an exterior surface of the hollow body. The first portion 100 may further include a second top wall 106 (broadly, a transverse wall) such that the second top wall, first circumferential wall 102, and second circumferential wall 104 define an inner chamber 107 dimensioned to accommodate the upper end of the insulator 40 and frame member 42. The construction of the insulator cover 100, and particularly the first and second circumferential walls 102, 104, configures the first portion for securely receiving insulators of different sizes within the inner chamber 107.

The insulator cover 100 may further include an opening 108 defined by a third circumferential wall 110 extending upward from the first top wall 106. The third circumferential wall 110 is located inwardly from the second circumferential wall 102 in a direction toward the longitudinal axis L. In some embodiments, not illustrated, at least a portion or at least a majority of the third circumferential wall 110 is located inwardly toward the longitudinal axis L from the second circumferential wall 104. The third circumferential wall 110 defines a third cross sectional area that is less than the cross sectional area of the second circumferential wall 104. The third circumferential wall 110 also defines a third volume that is less than the second volume defined by the second circumferential wall 104. The third circumferential wall 110 may include a pair of first wall sections 119 defining one end of the circumferential wall, a pair or second wall sections 121 extending from ends of respective first wall sections, and a third undulating wall section 123 extending between the second wall sections. The third undulating wall section 123 forms three gussets 111. A generally horizontal third top wall 127 (broadly, a transverse wall) extends between tops of the first and second wall sections 121, 123 of the third circumferential wall 110. A plurality of slots 129 are formed in the second top wall 127. In the illustrated embodiment, the slots 129 are mirrored about a slit 114 in the first portion 100 and comprise a closed first end and an open second end that communicates with the slit.

The third circumferential wall 110 and second top wall 127 form an access barrier around the wires W. In the illustrated embodiment, the opening 108 and the wall 110 have a generally crown-shaped configuration (as viewed in the orientation of FIG. 15) and surround wires W when properly installed. The slots 129 in the second top wall 127 provide deformable fingers that can engage portions of the wires W received into the opening 108. The deformation of the fingers formed by the slots 129 allows the open area of the opening 108 to remain relatively small. This discourages animals from entering into the cover 30 in a space between the wires W and the third circumferential wall 110. However, if the wires W or some structure associated with them requires additional space, the fingers formed by the slots 129 can deform to permit that structure to pass into the opening 108. Even as deformed, the fingers formed by the slots 129 operate to close any space between the structure (e.g., the wires W) received through the fingers and the third circumferential wall 110. However, the opening 108, wall 110, and third top wall 127 may have other configurations without departing from the scope of the disclosure. Risers 112 extend from the first top wall 106 to the third circumferential wall 110 to provide an obstacle or impediment to an animal, such as a squirrel or bird, nesting on the cover. In one embodiment, the risers 112 and wall 110 together define a barrier wall. In one embodiment, each riser 112 itself defines a barrier wall.

Figure 4:
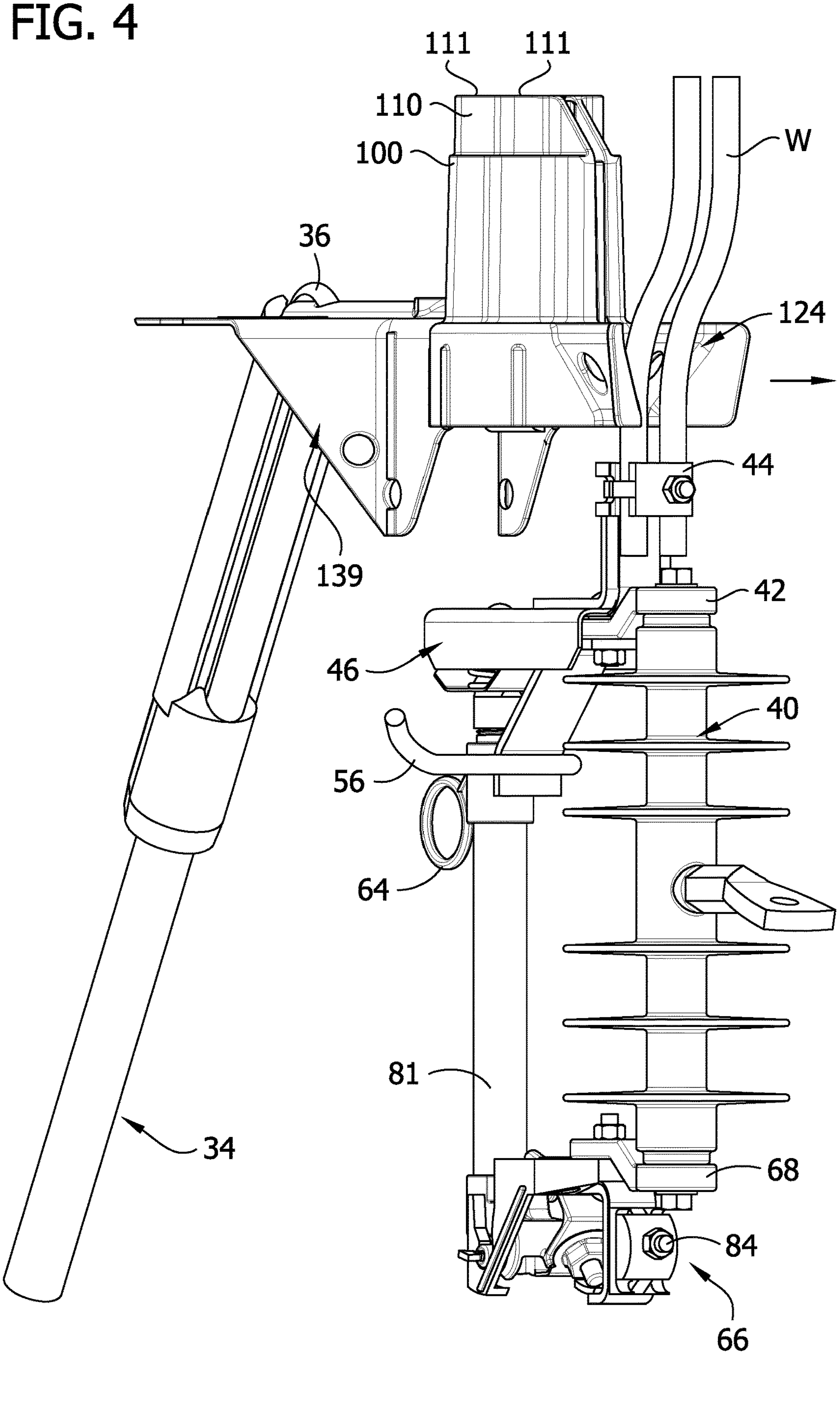
FIG. 4 is a perspective similar to FIG. 2 showing the cutout cover farther advanced toward the cutout assembly.
Figure 14:
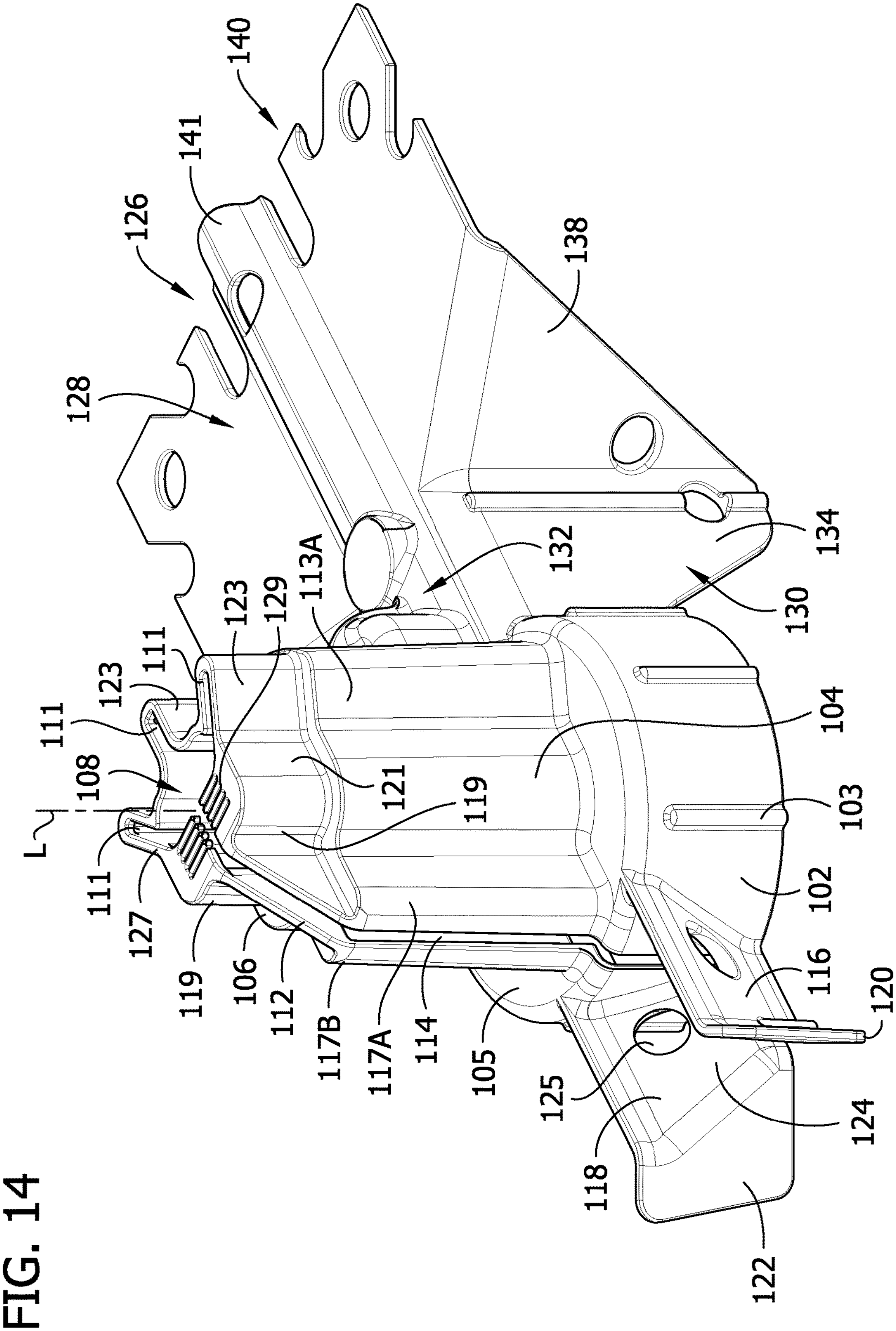
FIG. 14 is a rear top perspective thereof.

Referring to FIG. 14, the slit 114 extends through and along the first, second and third circumferential walls 102, 104, 110 at a rear of the first portion 100. It will be noted that the slit extends through the walls 102, 104, 110 and between the risers 112, and is in communication with the opening 108. As seen in FIG. 4, for example, the slit 114 allows the cover to spread open for installation. The three gussets 111 of circumferential wall 110 permit the cover to be opened more easily and/or wider at the slit 114 to install the cover. In particular, the gussets 111 act as living hinges, permitting the third circumferential wall 110 and the top walls 106, 127 to open sufficiently to receive the wires W and allow installation of the insulator assembly 32 into the insulator cover 100 for installation on a fuse cutout assembly. The opening 108, gussets 111 and slit 114 collectively form a "split" in the insulator cover in the illustrated embodiment. A first wing 116 extends from the wall 102 adjacent one side of the slit 114 and a second wing 118 extends from the wall 102 adjacent the opposite side of the slit 114. Each wing 116, 118 terminates in an outwardly splayed extension 120, 122, respectively. The splayed extensions 120 and 122 define a generally V-shaped opening 124 (see, FIGS. 15 and 16) which facilitates installation of the cover on the cutout assembly. Each wing includes a mounting hole 125 for engagement by a hot stick, such as a shotgun stick or the like.

The cover 30 further includes a second portion 126, which can be broadly referred to as an upper contact assembly shield, including a top wall 128 that extends over the second portion. The top wall 128 also can be referred to as a shield-shaped wall. There is an intermediate portion having a throat 130 between the first and second portions defined by a short top wall section 132 and vertical throat walls 134 and 136 that extend down from, and perpendicular to, the top wall section 132. The throat 130 is dimensioned to fit over and engage the upper contact assembly of a fuse cutout assembly as will be explained below.

There are perpendicular side walls 138 and 139 at right angles to the top wall 128. The side walls 138, 139, with the top wall 128, define a relatively wide opening or mouth 140 that communicates with the throat section 130. There is an integral, raised, longitudinal brace 141 on the top surface of the top wall 128 defining a longitudinal channel 142. A stability formation 144 extends between the wall 102 of the insulator cover 100 and the brace 141. The formation 144 also prevents nesting or standing by an animal. In the illustrated embodiment, the formation 144 comprises a fin 145 and a pair of shell members 147 (FIG. 12) disposed on opposite sides of the fin and extending upward from the brace 141. The shell members 147 cooperate to define a space capable of receiving bolt heads or other structure associated with the cutout assembly 32. The bolt shown in FIG. 8 directly underneath the space defined by the shell members 147 does not project into the space, but cutout assemblies having other configurations may require use of the space defined by the shell members 147. There may also be a hole or other opening in the formation 144 to provide another access point for installation, as will be explained.

As best seen in FIGS. 10, 11, 13, 15 and 17, a pair of opposed, longitudinally extending detents 146 and 148 are located on the inner surfaces of the throat walls 134 and 136. The detents have substantially arch-shaped cross-sections including exterior walls 150 and 152. The portions of the detents 146, 148 covered by the exterior walls 150, 152 are hollow (see, FIG. 11), which permits some deflection of the detents when fitted onto the sleet hood 46. The detents protrude into the throat 130. The detents 146 and 148 serve to provide a positive indication to the installer that the cover is secured on the fuse cutout assembly.

The size or configuration and composition of the detents can be varied in the molding process for versatility. It should be understood that while the configuration of the detents 146 and 148 work well, the detents can have any configuration, size or the like. By way of example only, the detents can be fingers, nubs, protrusions, buttons, cones and so forth and can be arranged as discrete elements or a plurality of elements without departing from the scope of the invention. Hence, the term detent should be construed to encompass all shapes, sizes and arrangements of elements that perform a function of securing the cover on the fuse cutout assembly.

The forward edges or margins of the wall 128 and bottom, outside corners of the perpendicular walls 138 and 139 include an arrangement of openings or holes 154 and adjacent slots 156. It will be understood that the plurality of hole and slot arrangements allow for the use of a shotgun stick (or other type of hot stick). The arrangements are provided in edge margin sections of the mouth extending in a generally horizontal plane and two generally vertical planes, and the arrangements extend at different angles with respect to each other. By way of example, a shotgun stick hook 36 can engage a hole 154 and retract, and an end portion of the stick can seat in an adjacent slot 156 for stabilization. The arrangement of shotgun stick engagement provides great versatility for mounting on a cutout assembly as will be discussed. The plurality of hole and slot arrangements provide a plurality of shotgun stick (or other hot stick) attachment points to allow an installer to attach the cover from various angles of approach.

FIGS. 1 through 6 illustrate installation of the cover 30 on a fuse cutout assembly 32 and the relative alignment of the cover on the fuse cutout cover. An installer, such as an electric lineworker or technician, can grasp the cutout cover with a shotgun stick at any convenient site, such as any one of the hole and slot combinations. Due to the presence of multiple sites, the cover 30 can be installed from just about any angle. The lineworker can install the cover by hand in the case where the cutout is not energized. The lineworker can install the cover by hand wearing electrically insulating gloves when the cutout assembly is energized. As seen in FIGS. 2 and 4, the cover 30 is advanced toward the cutout assembly. The wires W (and/or insulator connectors 44) are positioned in the V-shaped opening 124. The cover is urged onto the assembly by pushing the splayed extensions 120 and 122 against the wires W or insulator connectors 44, which act as inclined planes to force the wings 116 and 118 apart and cause the cover to open at the slit 114. As the slit 114 opens, the gussets 111 also open. It will be appreciated that the opening displacement of the slit 114 is distributed among the multiple gussets 111. In other words, the individual gussets open a fraction (e.g., about one third) of the amount the slit 114 opens. Accordingly, the gussets 111 are individually subjected to less deformation, are less prone to breaking (particularly in cold weather), and make the slit 114 easier to open. After the cover 30 is pushed sufficiently onto the fuse cutout assembly, the slit closes because of the bias of the gussets 111 and the resilient nature of the material of the cover.

Figure 5:
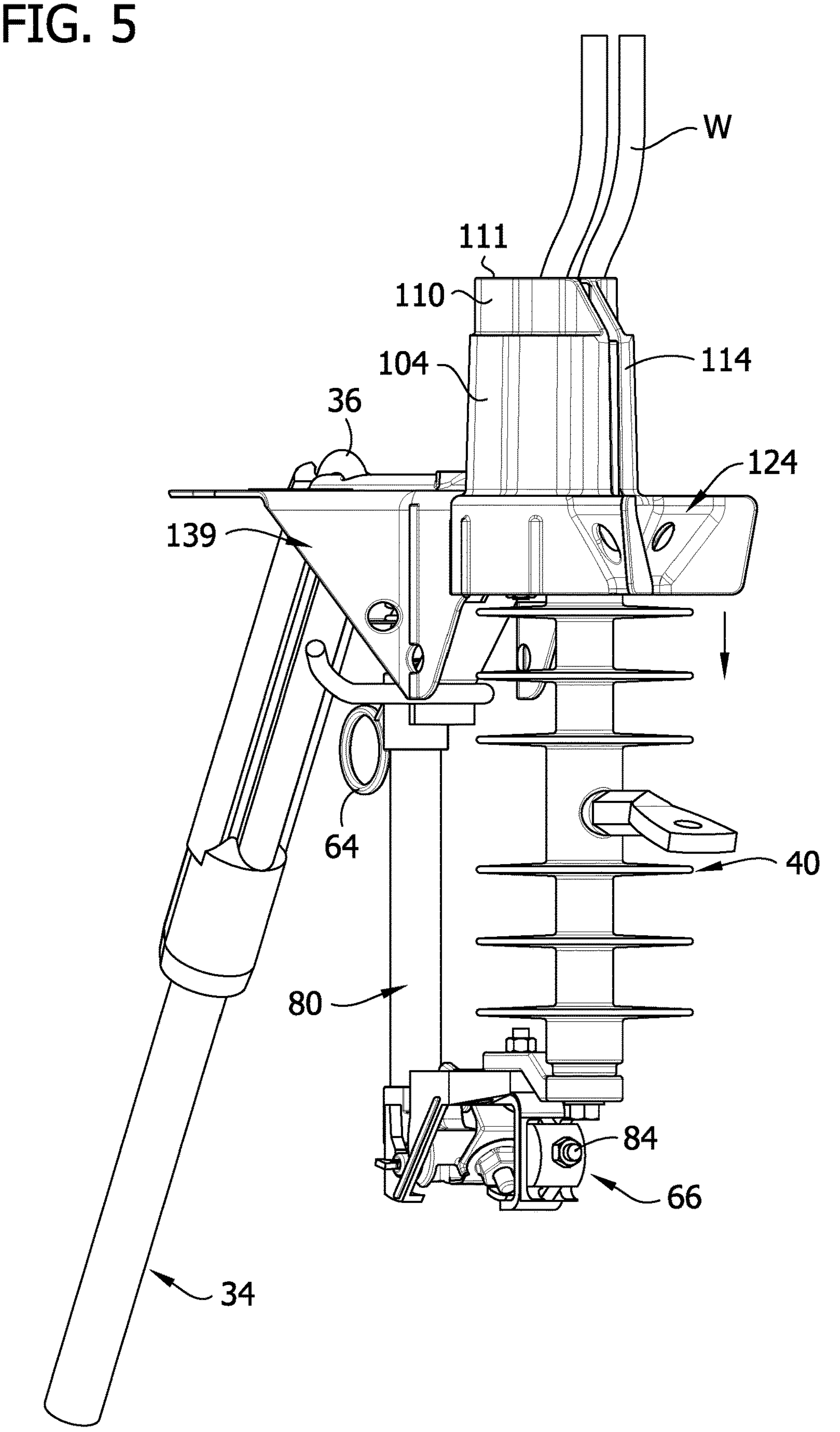
FIG. 5 is a perspective similar to FIG. 4 showing the cutout cover being moved down onto the cutout assembly.
Figure 6:
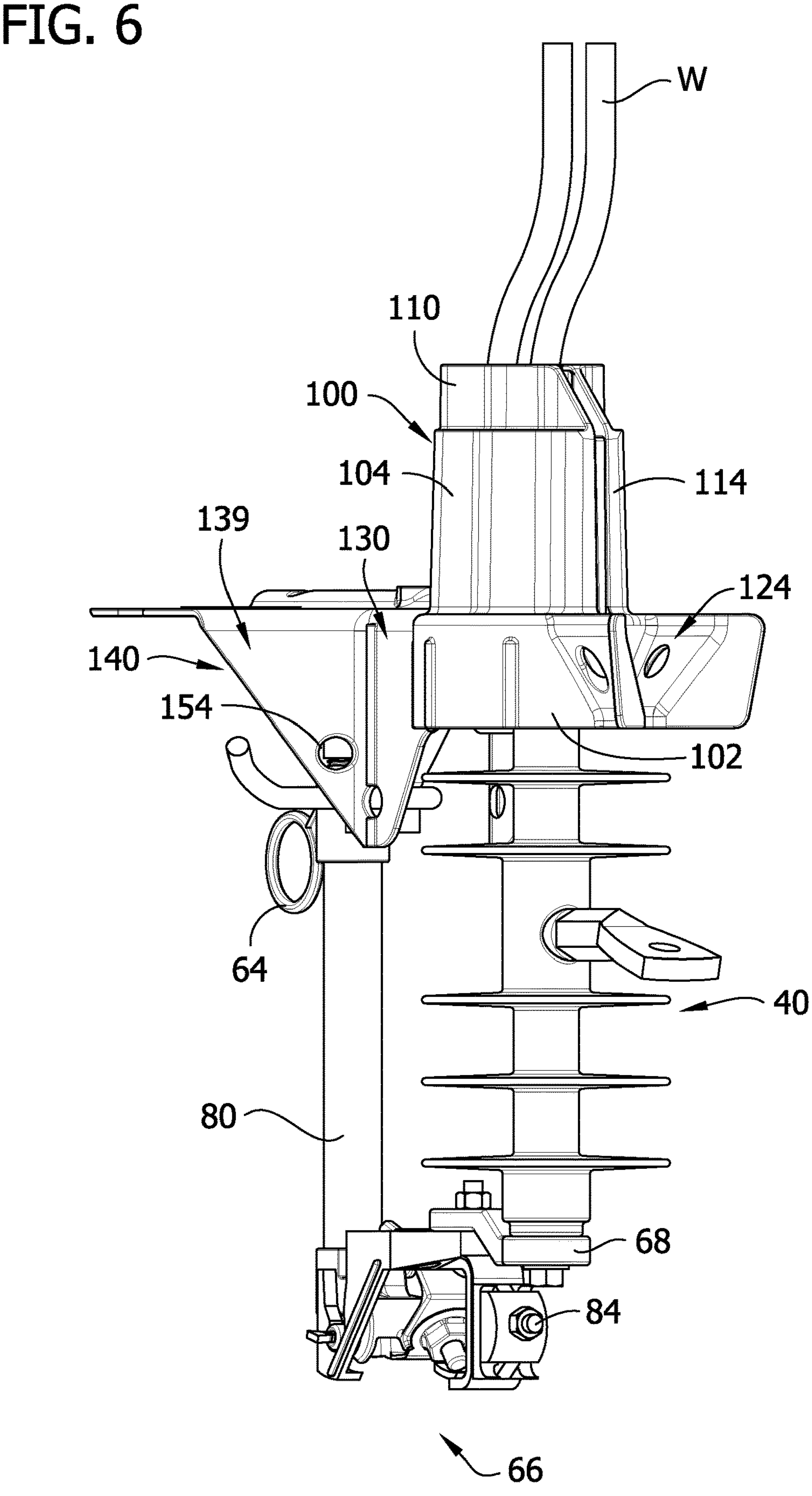
FIG. 6 is a rear perspective of the cutout cover mounted on the fuse cutout assembly.
Figure 7:
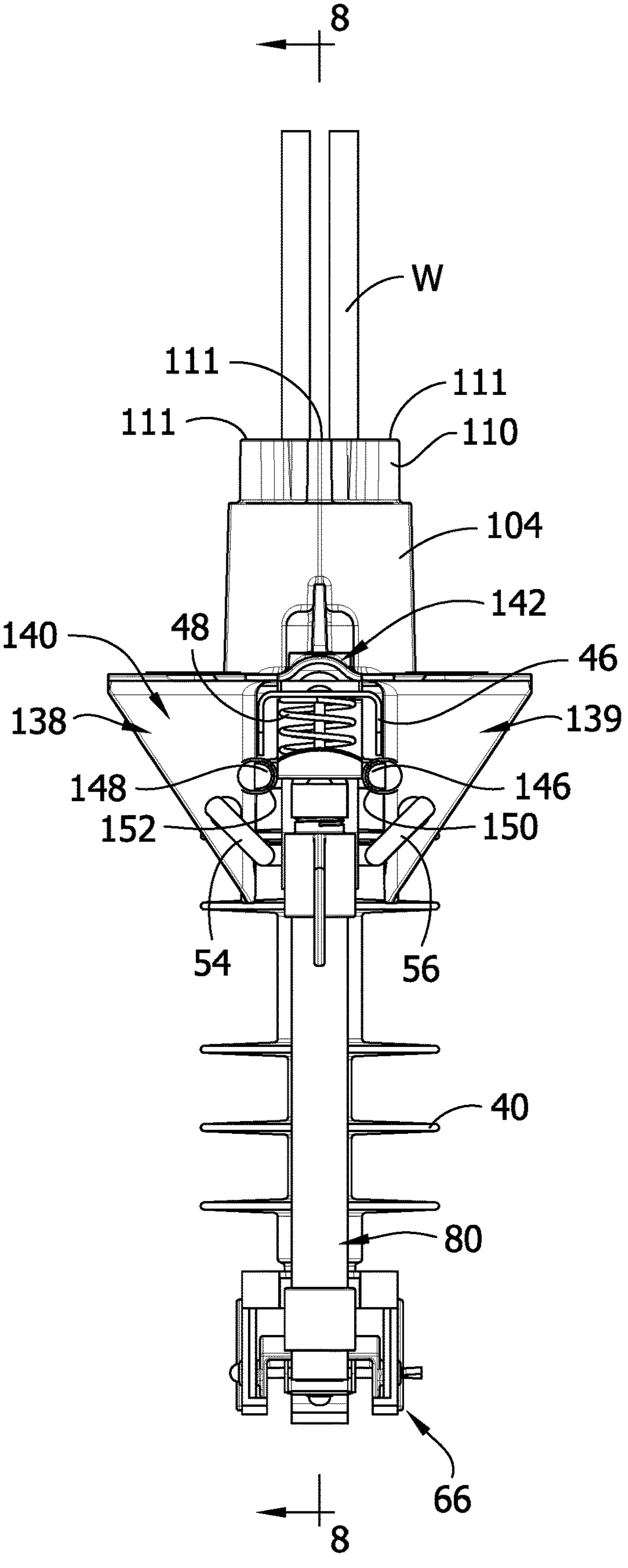
FIG. 7 is a front view thereof.
Figure 10:
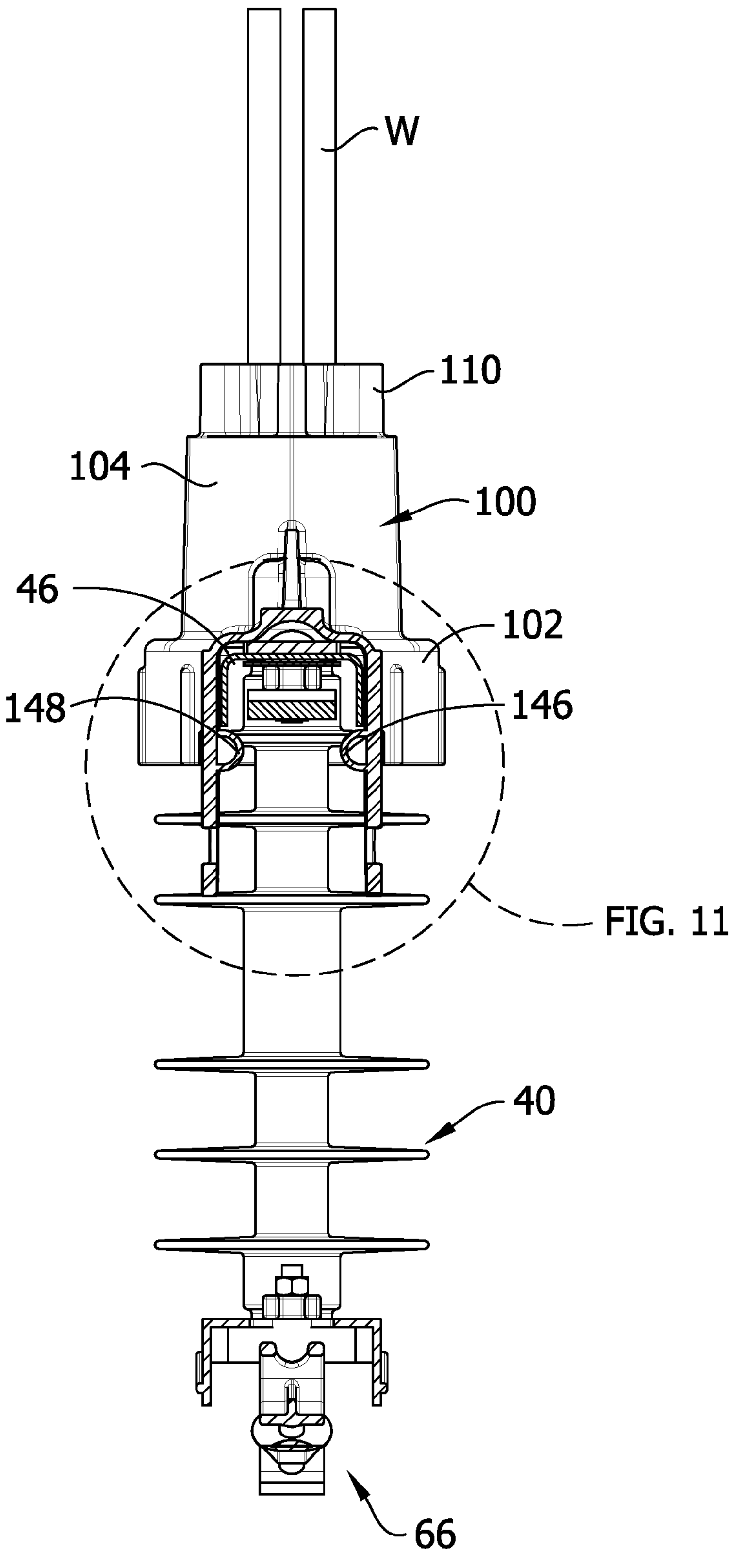
FIG. 10 is a section taken in the plane including line 10-10 of FIG. 9.
Figure 11:
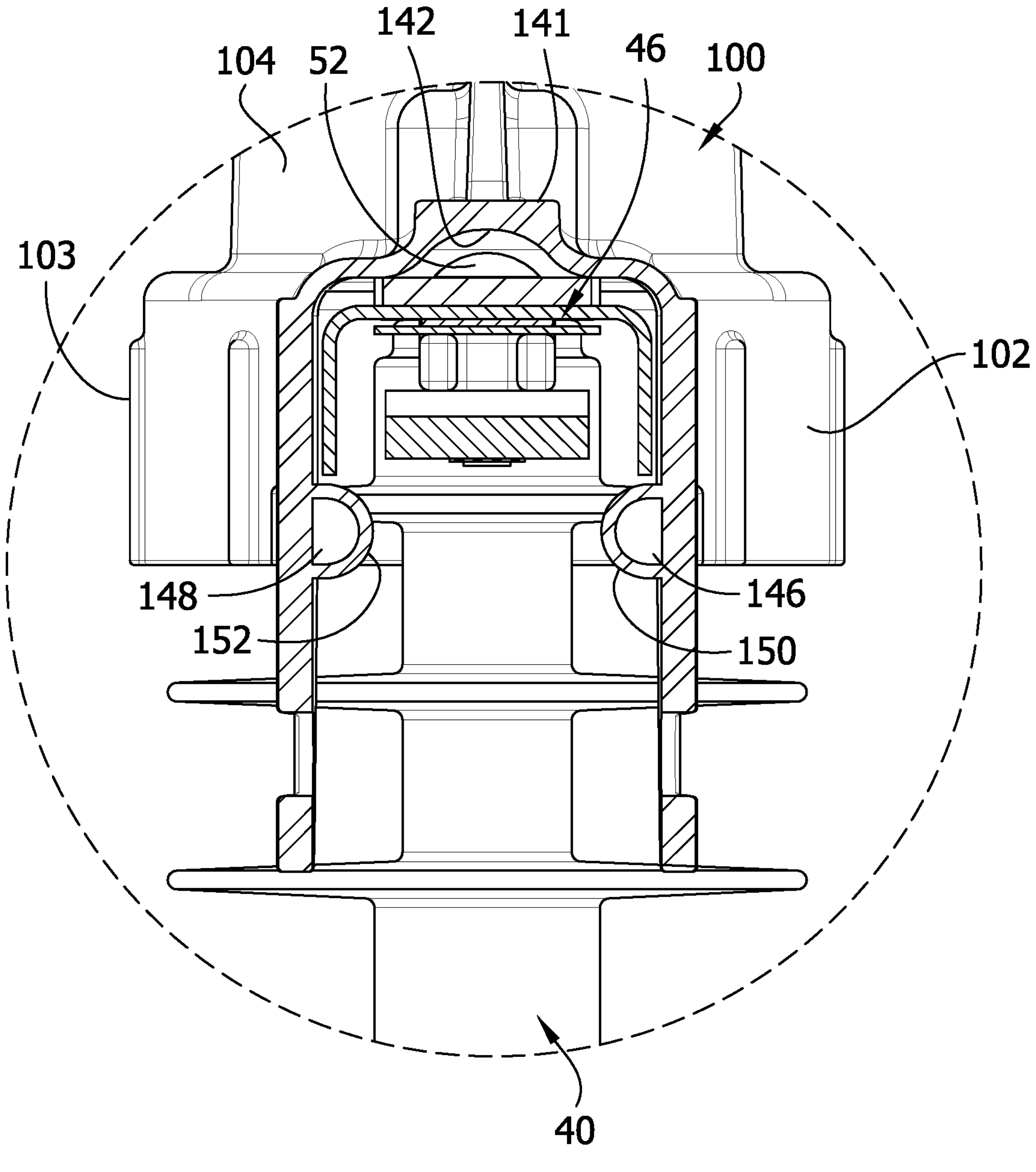
FIG. 11 is an enlarged view of a portion of the section of FIG. 10.
Figure 12:
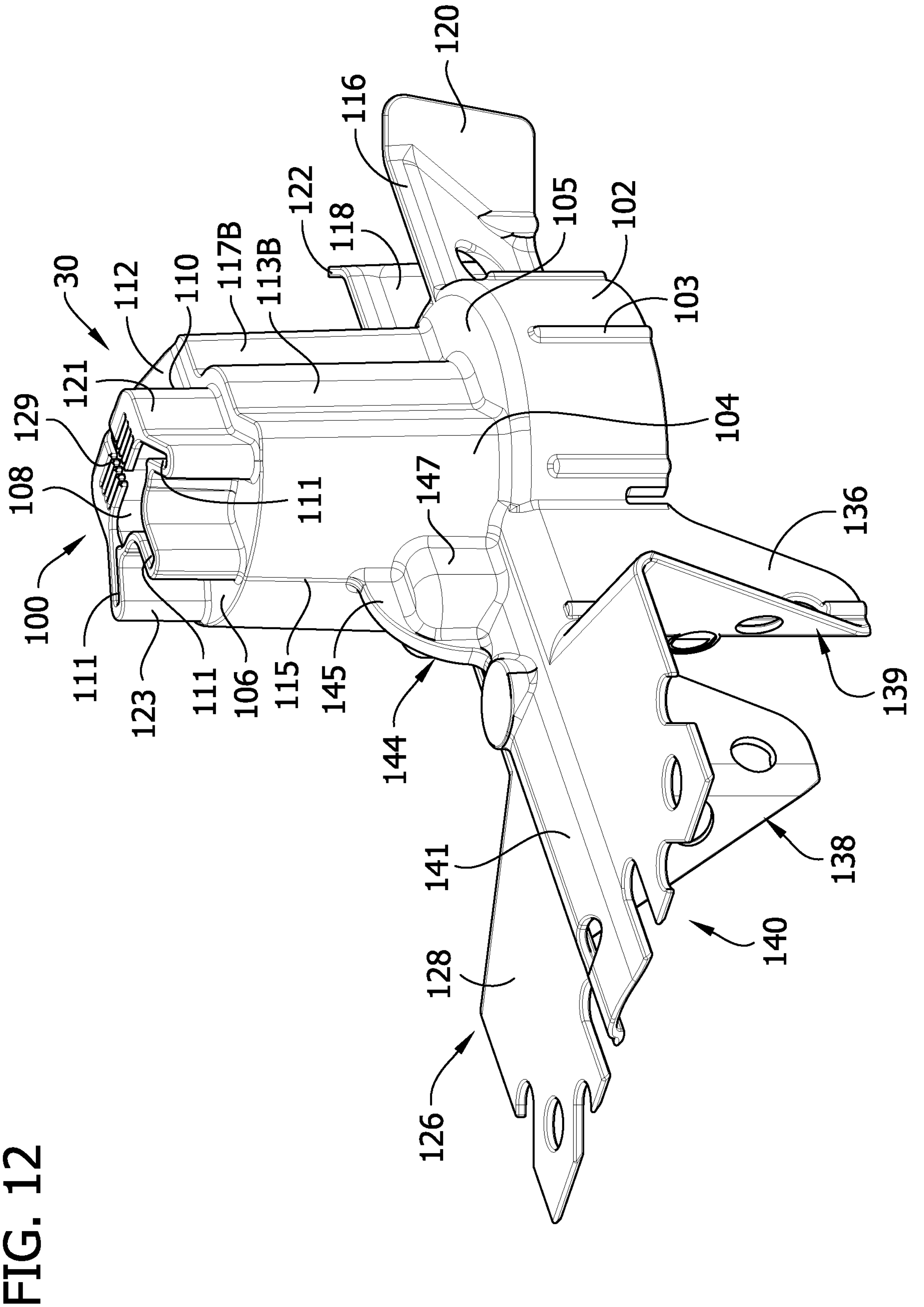
FIG. 12 is a front top perspective of the cutout cover.
Figure 13:
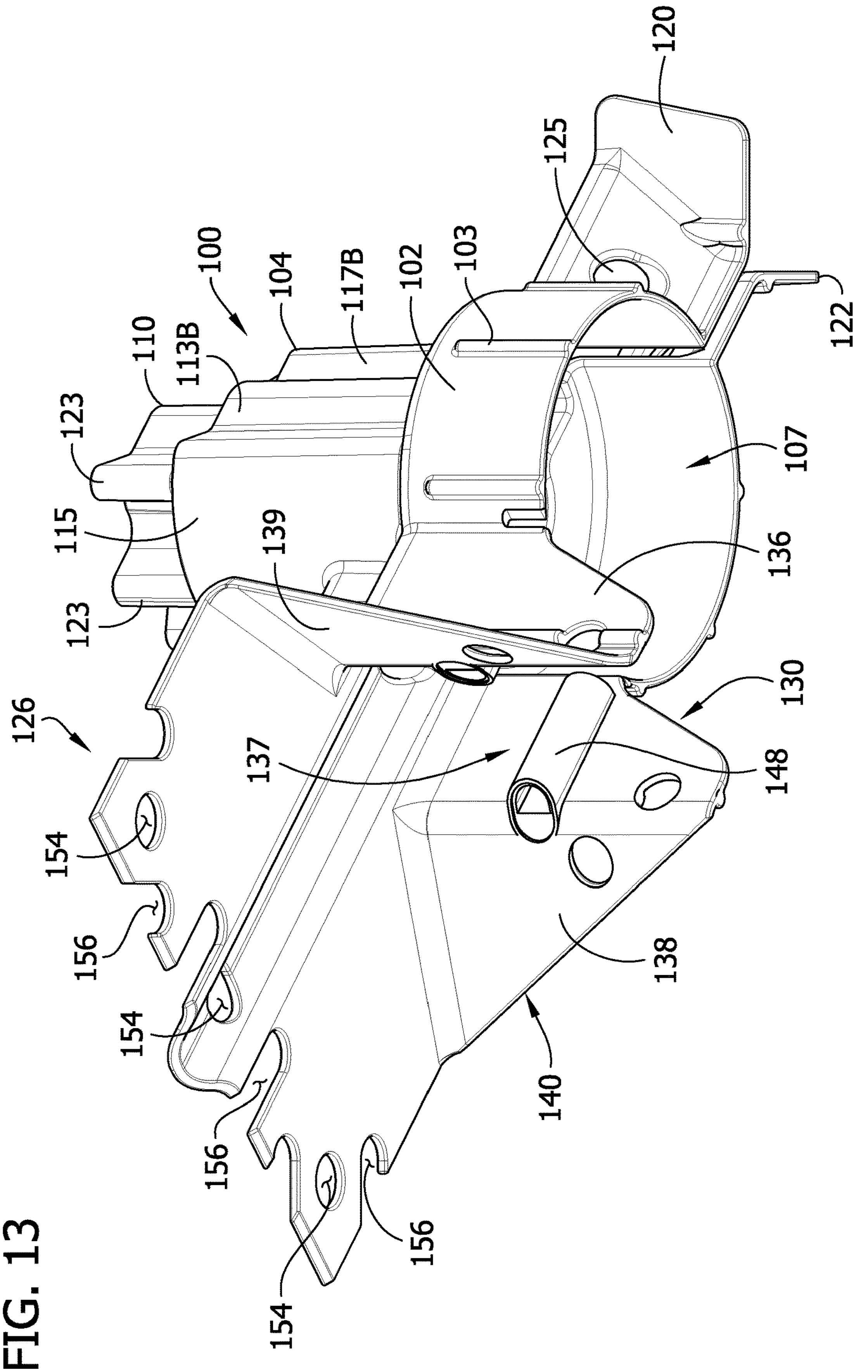
FIG. 13 is a front bottom perspective thereof.

As indicated by the arrow in FIG. 5, after the cover is pushed horizontally or laterally onto the assembly, the cover may then be urged down on the assembly. As best seen in FIGS. 7, 10 and 11, the sloped or angled walls 150, 152 of the detents 146 and 148, respectively, function as ramps to allow the detents to slide down over structure adjacent to the upper contact, for example, over sleet hood 46, spreading apart the throat 130 until the detents slide below the sleet hood and are biased toward each other under the sleet hood or other structure by the resilient quality of the cover material. If a harder polymer or plastic is used to form the cover, when the detents are properly positioned, as shown in FIGS. 10 and 11, there can be an audible and/or tactile indication that assures the installer the cover is properly positioned on the fuse cutout assembly. Even if a softer polymer is employed in the cover or the detents, the installer will be able to feel the detents positively engage the upper contact structure. The detents provide a positive indication the cover is properly installed. The detents abut the bottom of the sleet hood or other structure to keep the cover from being dislodged by winds up to 70 mph or by wildlife.

It will be noted that in the illustrated embodiment, the detents are shown to engage a sleet hood. This is shown for purposes of simplicity and convenience because many modern fuse cutout assemblies employ a sleet hood. However, it is intended that the cover 30 can be used with any fuse cutout assembly, even those without a discrete sleet hood. In those situations, the cover 30 is designed to slide down over and engage other structure or structures at the upper end of the fuse cutout assembly, such as an electrical contact, a brace, a frame member, or any other structure. Hence, the term sleet hood is representative of any structure that can accommodate the cutout cover. The cover is not limited to use on fuse cutouts having a sleet hood.

It will be appreciated that the detent arrangement secures the cover in place without the need for any clips, buttons, ties, inserts or other apparatus. Also as seen in FIG. 11, the longitudinal channel 142 under the longitudinal brace 141 provides space for the rivet 52 to pop up into the channel when the fuse holder is snapped into the spring biased upper contact. This clearance allows the fuse holder to be properly closed with the cover 30 in place.

As seen in the drawings, when the cover 30 is properly installed, there is very little clearance or gap between the cover and the cutout assembly, leaving little room for invasion by animals or birds, dirt, or debris. The top wall 128 extends out over the fuse cutout assembly and the perpendicular walls 138 and 139 provide side barriers so as to shield the cutout from the elements and prevent access by wildlife. There is no bottom wall at mouth 140 and hence no structure on which a squirrel or bird can build a nest. However, the cover 30 provides access to the pull ring 64 and the hooks 54 and 56 with a load break tool or hot-stick or other tool at the mouth 140. The fuse tube can swing open and closed with the cover 30 in place.

As discussed above, it is often necessary to employ a load break tool with a fuse cutout assembly. When installed, the cutout cover 30 allows access to the cutout assembly with a load break tool. The technician can access both the hooks and the pull ring with the load break tool at mouth 140. But the cutout cover 30 does not create any openings or voids for access or nest building by wildlife. It is a significant advantage to have access yet protection against unwanted intrusion.

Desirably, the cover 30 is molded from a resilient, flame-retardant, UV resistant, polymer material, generally in a cavity mold. The cover is resilient, relatively flexible, non-conductive, strong, and durable. It will be understood that fuse cutout assemblies come in different widths and depths and styles, and that by employing interchangeable inserts in the mold, the size and slope angle and composition of the detents can be varied without the use of a completely different mold. Any configuration, size, orientation or composition of detents can be formed from the same mold merely by changing the mold insert.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A fuse cutout cover for use with fuse cutout assemblies having insulators of different sizes and configurations, the fuse cutout assemblies each further including a fuse and an upper contact assembly for engaging an upper end of the fuse, the cover comprising:

a contact assembly shield configured for shielding the upper contact assembly; and an insulator cover configured for covering at least an upper end of the insulator, the insulator cover comprising a hollow body having a central longitudinal axis and including a first side wall having a first height, a second side wall disposed above the first side wall, the second side wall having a second height and at least a portion of the second side wall being located inwardly of the first side wall toward the longitudinal axis of the hollow body, a first top wall extending between the first side wall and the second side wall at a top of the first side wall, the first top wall being discontinuous with the first side wall and the second side wall, and a third side wall disposed above the second side wall, the third side wall having a third height and at least a portion of the third side wall being located inwardly of the second side wall toward the longitudinal axis of the hollow body, and a second top wall extending between the second side wall and the third side wall at a top of the second side wall, the second top wall being discontinuous with the second side wall and the third side wall.

2. A fuse cutout cover as set forth in claim 1 wherein at least a majority of the second side wall is located inwardly of the first side wall toward the longitudinal axis of the hollow body.

3. A fuse cutout cover as set forth in claim 2 wherein at least a majority of the third side wall is located inwardly of the second side wall toward the longitudinal axis of the hollow body.

4. A fuse cutout cover as set forth in claim 1, further comprising a first transverse wall extending from a top of the first side wall forming a shoulder on the hollow body.

5. A fuse cutout cover as set forth in claim 2, further comprising a second transverse wall extending from a top of the second side wall.

6. A fuse cutout cover as set forth in claim 5, further comprising a third transverse wall extending from a top of the third side wall and defining an opening.

7. A fuse cutout cover as set forth in claim 4, further comprising a split formed in the first, second and third side walls, the split permitting the insulator cover to be resiliently deformed to receive portions of the cutout assembly into the insulator cover.

8. A fuse cutout cover as set forth in claim 1, wherein the contact assembly shield and the insulator cover are formed from a single piece of material.

9. A fuse cutout cover as set forth in claim 1, wherein the first side wall comprises a generally cylindrical wall.

10. A fuse cutout cover as set forth in claim 9, wherein the second side wall comprises a non-cylindrical wall.

11. A fuse cutout cover as set forth in claim 10, wherein the third side wall comprises a non-cylindrical wall.

12. A fuse cutout cover for use with fuse cutout assemblies having insulators of different sizes and configurations, the fuse cutout assemblies each further including a fuse and an upper contact assembly for engaging an upper end of the fuse, the cover comprising:

a contact assembly shield configured for shielding the upper contact assembly; and an insulator cover having a longitudinal axis extending through a center of the insulator cover, the insulator cover being configured for covering at least an upper end of the insulator, the insulator cover comprising a hollow body including a first side wall, a second side wall disposed above the first side wall and a third side wall disposed above the second side wall, the second side wall being shaped to define a first space having a first cross sectional area, and a second space having a second cross sectional area smaller than the first cross sectional area, the longitudinal axis passing through the second space and the first space being located radially outward from the longitudinal axis.

13. The fuse cutout cover as set forth in claim 12 wherein the second side wall defines a third space having a third cross sectional area smaller than the second cross sectional area.

14. The fuse cutout cover as set forth in claim 13 wherein the second side wall includes a first side wall section having a serpentine shape.

15. The fuse cutout cover as set forth in claim 14 wherein the second side wall further includes a second side wall section opposite the first side wall section, the second side wall section having a serpentine shape.

16. The fuse cutout cover as set forth in claim 15 wherein the second side wall further includes a third side wall section extending between the first and second side wall sections of the second side wall, the third side wall section having an arcuate shape.

17. The fuse cutout cover as set forth in claim 16 wherein the second side wall further includes a fourth side wall section located on an opposite end of the first side wall section from the third side wall section.

18. The fuse cutout cover as set forth in claim 12 wherein the first side wall is generally cylindrical and the second side wall is non-cylindrical.

19. A fuse cutout cover as set forth in claim 12, further comprising a continuous slit extending through the first side wall, second side wall and third side wall, the slit permitting the insulator cover to be resiliently deformed to receive portions of the cutout assembly into the insulator cover.

20. A fuse cutout cover as set forth in claim 19 wherein the slit separates the first side wall section of the second side wall from the second side wall section of the second side wall.

* * * * *